(12) United States Patent
Siebecke et al.

(10) Patent No.: US 9,643,797 B2
(45) Date of Patent: May 9, 2017

(54) CONVEYING DEVICE FOR GRANULATE AND ALSO METHOD FOR CONVEYING GRANULATE

(71) Applicant: UHDE INVENTA-FISCHER GMBH, Berlin (DE)

(72) Inventors: Ekkehard Siebecke, Berlin (DE); Mirko Bär, Birkenwerder (DE); Bernd Königsmann, Langewahl (DE)

(73) Assignee: UHDE INVENTA-FISCHER GmbH, Berlin (DE)

( * ) Notice: Subject to any disclaimer, the term of this patent is extended or adjusted under 35 U.S.C. 154(b) by 0 days.

(21) Appl. No.: 14/762,105

(22) PCT Filed: Jan. 20, 2014

(86) PCT No.: PCT/EP2014/051003
§ 371 (c)(1),
(2) Date: Jul. 20, 2015

(87) PCT Pub. No.: WO2014/114586
PCT Pub. Date: Jul. 31, 2014

(65) Prior Publication Data
US 2015/0314969 A1  Nov. 5, 2015

(30) Foreign Application Priority Data
Jan. 25, 2013 (EP) .................... 13152700

(51) Int. Cl.
*B65G 53/00* (2006.01)
*B65G 53/16* (2006.01)
(Continued)

(52) U.S. Cl.
CPC ............. *B65G 53/16* (2013.01); *B65G 53/30* (2013.01); *B65G 53/22* (2013.01)

(58) Field of Classification Search
CPC ........ B65G 53/58; B65G 53/12; B65G 53/14; B65G 53/30; B65G 53/60
(Continued)

(56) References Cited

U.S. PATENT DOCUMENTS

| | | | | |
|---|---|---|---|---|
| 1,908,220 A | * | 5/1933 | Chapman ............... | B65G 53/30 406/131 |
| 3,490,654 A | * | 1/1970 | Fischer ................... | B65G 53/66 111/130 |

(Continued)

FOREIGN PATENT DOCUMENTS

| | | |
|---|---|---|
| DE | 199 06 496 A1 | 8/2000 |
| DE | 10 2004 018023 A1 | 11/2005 |

(Continued)

OTHER PUBLICATIONS

European Patent Office, International Search Report in International Application No. PCT/EP2014/051003 (May 6, 2014).

(Continued)

*Primary Examiner* — Joseph Dillon, Jr.
(74) *Attorney, Agent, or Firm* — Leydig, Voit & Mayer, Ltd.

(57) ABSTRACT

The invention relates to a conveying device for conveying granular material that is stored in a source (10), for example polyamide 6 (PA6) granules, to multiple receiving points (11, 12, 13, . . . ), the conveying device having a number of injectors (11, 12, 13, . . . ) corresponding to the number of receiving points. Also disclosed is a method for conveying granular material, for example PA6 granules, from a source (10) to multiple receiving points.

16 Claims, 2 Drawing Sheets

Figure 1:
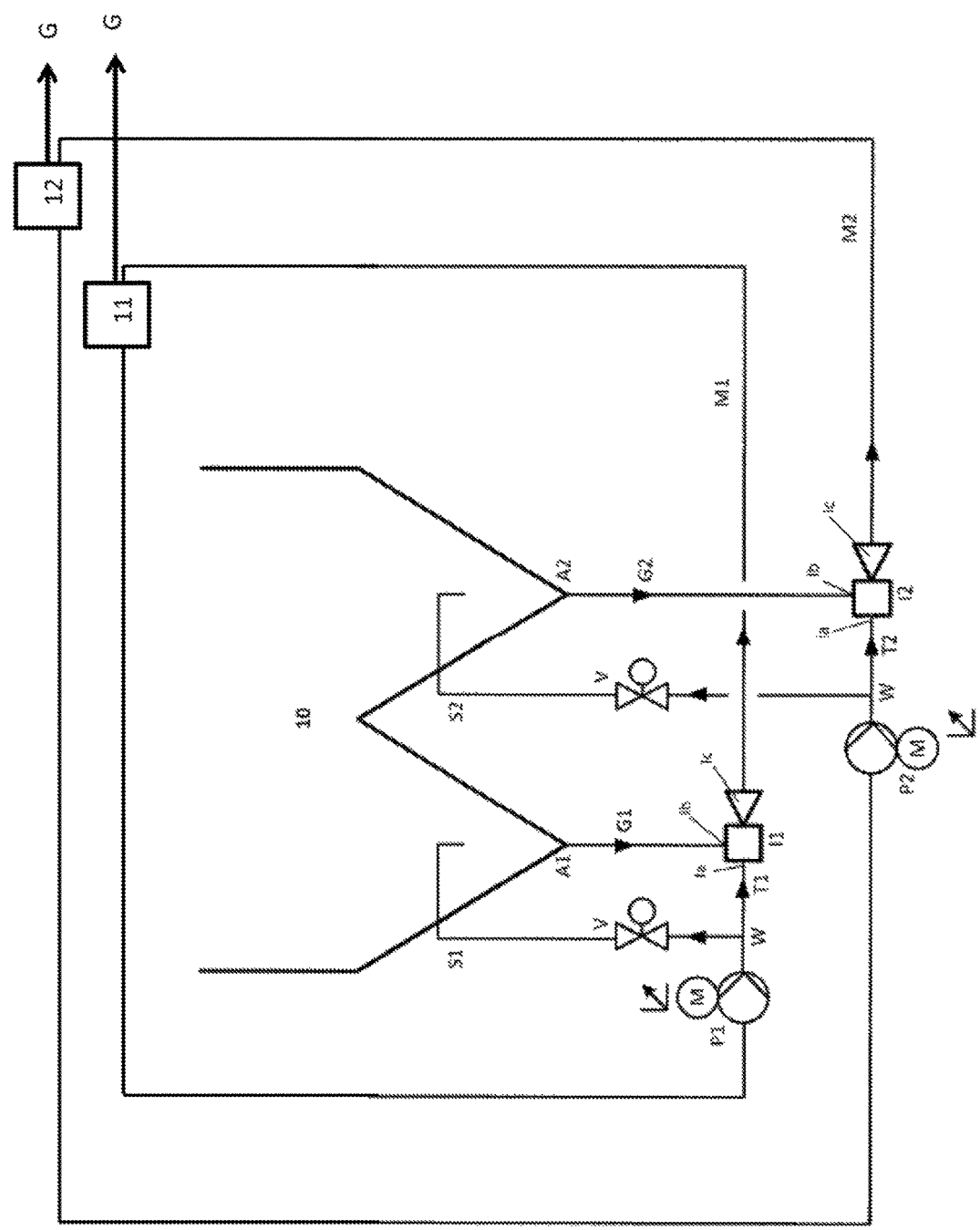

(51) Int. Cl.
*B65G 53/30* (2006.01)
*B65G 53/22* (2006.01)

(58) Field of Classification Search
USPC ......... 406/92, 123, 106, 136, 144, 146, 155, 406/175
See application file for complete search history.

(56) References Cited

U.S. PATENT DOCUMENTS

| | | | | |
|---|---|---|---|---|
| 5,071,289 | A * | 12/1991 | Spivak | B65G 53/22 406/11 |
| 5,478,172 | A * | 12/1995 | Oura | B01F 15/00194 406/106 |
| 6,890,129 | B2 * | 5/2005 | Fabbri | B01D 29/01 406/106 |
| 7,270,249 | B1 * | 9/2007 | Burkhead | B65G 53/14 222/58 |
| 7,311,474 | B1 * | 12/2007 | Ogasahara | B65G 53/26 406/143 |
| 8,844,615 | B2 * | 9/2014 | Luharuka | E21B 43/267 166/270.1 |
| 8,936,416 | B2 * | 1/2015 | Stutz, Jr. | B65G 53/40 222/400.5 |
| 8,967,919 | B2 * | 3/2015 | Yaluris | C10G 11/18 177/1 |
| 8,985,391 | B2 * | 3/2015 | Ross | B29B 13/022 222/1 |
| 9,086,164 | B2 * | 7/2015 | Mortzheim | F16K 24/00 |
| 9,115,320 | B2 * | 8/2015 | Hu | C10J 3/506 |
| 9,371,197 | B2 * | 6/2016 | White | B01J 8/1809 |
| 2014/0243473 | A1 * | 8/2014 | Siebecke | C08G 69/16 524/606 |
| 2014/0249330 | A1 * | 9/2014 | Siebecke | C07C 51/412 562/590 |
| 2016/0001254 | A1 * | 1/2016 | Siebecke | B01J 19/0013 528/323 |
| 2016/0032050 | A1 * | 2/2016 | Siebecke | B01J 19/0013 528/310 |

FOREIGN PATENT DOCUMENTS

| | | |
|---|---|---|
| EP | 1 052 203 A2 | 11/2000 |
| WO | WO 2009/157857 A1 | 12/2009 |

OTHER PUBLICATIONS

European Patent Office, Written Opinion in International Application No. PCT/EP2014/051003 (May 6, 2014).

European Patent Office, First Office Action in European Patent Application No. 13 152 700.4 (Aug. 28, 2015).

* cited by examiner

CONVEYING DEVICE FOR GRANULATE AND ALSO METHOD FOR CONVEYING GRANULATE

CROSS-REFERENCE TO RELATED APPLICATIONS

This patent application is the U.S. national phase of International Application No. PCT/EP2014/051003, filed on Jan. 20, 2014, which claims the benefit of European Patent Application No. 13152700.4, filed Jan. 25, 2013, the disclosures of which are incorporated herein by reference in their entireties for all purposes.

The present invention relates to a conveying device for conveying granular material which is stored in a source, for example polyamide 6 (PA6) granulate, to a plurality of receiving places, the conveying device having a number of injectors corresponding to the number of receiving places. In addition, the present invention indicates a method for conveying granular material, for example PA6 granulate, from a source to a plurality of receiving places.

In the extraction of polyamide granulates (and granulates of the copolymers of polyamide), there is a requirement to transport a granulate-water mixture over fairly large distances (>20 m) and heights (>10 m). This takes place between individual extraction reactors in the case of multistage extraction and also between the last extraction reactor and subsequent drying step. For this purpose, in addition to conveying the granulate-water mixture by means of pumps suitable for this (unchokable pump with open impeller), also conveyance by means of injectors (static propeller pump) has been well tried. By means of a propellant flow, the granulate is conveyed by the injector and conducted to the receiving place together with the propellant flow. There, the propellant flow is separated and guided back again to the propellant pump. For reasons of cost, the use of injectors when conveying from a sending place to respectively one receiving place is preferred. The propeller pump when using injectors, which is generally designed as a multistage centrifugal pump, is generally more favourable than the special pump which is required for conveying a granulate-water mixture without damaging the granulate. The efficiency of such a pump is generally significantly poorer than the efficiency of a multistage pump with closed impeller.

Control of the conveyed quantity of granulate is effected generally by means of a rotating-vane feeder which is installed in the inflow of the conveying pump or of the injector. The use of rotating-vane feeders is very complex and expensive, in particular because of the corrosive effect of the polyamide monomer, caprolactam. Very powerful and corrosion-resistant sealing materials require to be used.

The heart and object of this invention is the development of a conveying system for a granulate-water mixture from a sending place or source to a plurality of receiving places, e.g. granulate-water transport from the last extraction reactor to a plurality of drying reactors which are subsequently connected in parallel. The use of rotating-vane feeders and the use of special pumps (open impeller or unchokable pump) are intended hereby to be dispensed with for reasons of cost, nevertheless precise metering capacity of the conveyed flows should however be ensured.

It is therefore the object of the present invention to indicate a conveying device which enables the conveyance of granular material from a source to a plurality of receiving places in a reliable manner. Likewise, it is the object of the present invention to indicate a corresponding conveying method for granular material.

This object is achieved, with respect to the conveying device, by the features of claim 1, with respect to a method for conveying granulate material, by the features of claim 14. The respective dependent claims thereby represent advantageous developments.

According to the invention, a conveying device is hence indicated for conveying granular material, which is stored in a source, from the source to a plurality of receiving places, which comprises a number of injectors corresponding to the number of receiving places, each injector having a propellant inflow, a granulate inlet connected to an outlet of the source and also an outlet for a mixture of propellant and granulate, and at least one propellant pump which is connected in front of each injector via the respective propellant inflow.

According to the present invention, it is hence provided that parallel-installed injectors are used for conveying granular material to a plurality of receiving stations, in particular in the form of granulate-water mixtures.

Such a conveying device offers the following advantages:

The investment costs for the described device are significantly lower than the investment costs which would arise in the combination of rotating-vane feeder with special pump or rotating-vane feeder with injector.

The precision of control of the conveyed quantity of granulate is equal to the precision which can be achieved by means of a rotating-vane feeder.

By recycling extraction liquid which has been conveyed with the granulate out of the extraction reactor, a liquid flow is produced in the direction of the injector in the outlet of the extraction reactor. As a result, the flow rate of the granulate is increased and the dimension of the outlet connection pieces can be reduced. This is not possible when using rotating-vane feeders.

The operating costs when using injectors are slightly lower than when using a special pump with low efficiency.

A possible development of the conveying device according to the invention provides that, between each injector and the respectively at least one pre-connected propellant pump, at least one branch is present for separating a rinsing flow of the propellant in the source.

By means of this rinsing flow, improved discharge of granular material out of the source can be ensured.

In particular, the rinsing flow is thereby fed into the source such that granulate stored in the source is conveyed in the direction of the outlet.

Preferably, the rinsing flow is regulatable, in particular the rinsing flow has a control valve.

A further preferred embodiment provides that the at least one propellant pump is a multistage centrifugal pump with closed or open impeller.

The use of a frequency changer for the motor of the propellant pump is advantageous for the design. By modification of the speed of rotation of the pump, pressure and conveyed quantity of the propellant and hence also the quantity of the conveyed granulate to the corresponding receiving place can be adjusted. Alternatively, the receiving places can advantageously have a separating device for separating the granulate from the propellant.

In particular, the propellant of the conveying device can be guided in a circulation, i.e. after separation of the granulate from the propellant at the receiving places, the propellant is used again for conveying granular material from the source to the receiving places.

The convening device is particularly advantageously free of control mechanisms, in particular rotating-vane feeders and/or fittings.

The source can be configured in particular in two preferred embodiments, the source a) having, on the one hand, an outlet for the granulate, the granulate flow being divided, after leaving the source, via a branch into a number of partial flows corresponding to the number of receiving places and being supplied to a corresponding granulate inlet of an injector, or b) having at least two outlets, via which a granulate flow respectively is removed from the source and supplied to a corresponding granulate inlet of an injector.

In particular, the source is an extraction reactor for extracting granulate.

The granular material is thereby in particular a granulate of a thermoplastic polymer, preferably polyamide granulate, in particular PA6 granulate.

The propellants can be liquid or gaseous and are selected in particular from the group consisting of water or mixtures of water and ϵ-caprolactam.

The present invention likewise relates to a method for conveying granular material, which is stored in a source, from the source to a plurality of receiving places with a previously described conveying device, in which a propellant flow is produced by means of the propellant pump and is fed via the respective propellant inflow into the respective injector, the granular material is discharged out of the at least one outlet of the source and supplied via the granulate inlet to an injector and is mixed in the injector with the propellant flow and discharged as granulate-/propellant flow via the outlet out of the respective injector, and is supplied to the respective receiver.

A particularly advantageous embodiment of the method provides that the propellant flow is divided into a rinsing flow and a propellant flow which is fed via the propellant inflow into the respective injector, the granular material being discharged by means of the rinsing flow out of the at least one outlet of the source and being supplied via the granulate inlet to an injector.

Preferably, the pressure at the branch is set to be higher than the output pressure at the outlet of the source.

The present invention is explained in more detail with reference to the subsequent Figures and the example without however restricting the invention to the represented special parameters.

There are thereby shown

FIG. 1 a first embodiment of a conveying device according to the invention, and

Figure 2:
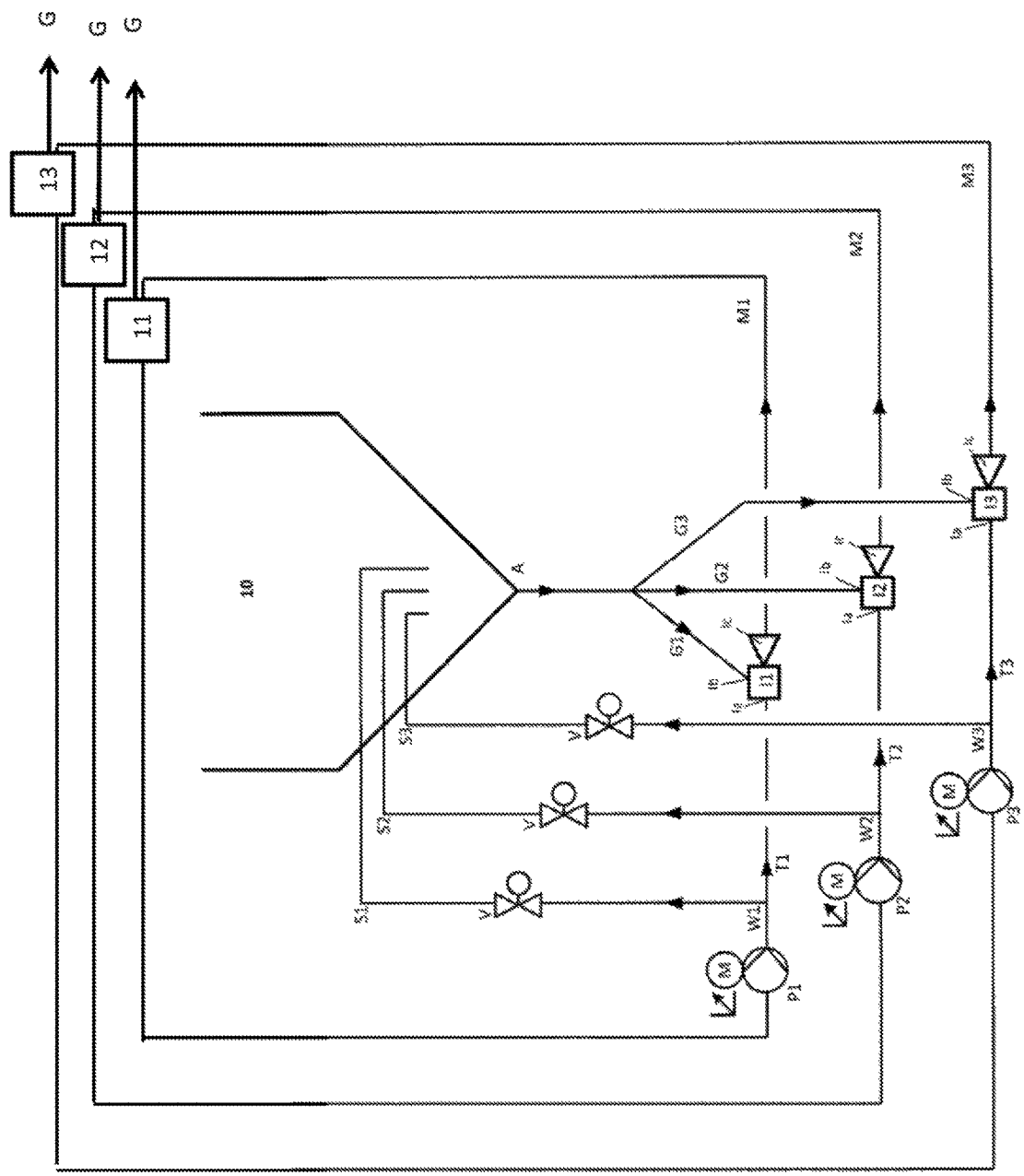

FIG. 2 a second embodiment of a conveying device according to the invention.

FIG. 1 shows a first embodiment of a conveying device according to the invention with which granular material can be conveyed from a source 10—as represented in FIG. 1 by way of example—to two different receiving places 11 or 12. The source 10 thereby has two outlets A1 and A2, the source 10 running in the vertical direction from the top to the bottom conically to the respective outlets A1 and A2 together. Through the outlet places A1 and A2, the granular material which is stored in the source 10 can be guided out of the source 10. Two partial flows G1 and G2 of the granular material which are supplied to two injectors I1 or I2 via the respective granulate inlet 1b are thereby produced. The number of injectors I hence corresponds to the number of receiving places. Each of the injectors I has in addition a propellant inflow Ia via which a corresponding propellant, for example water, can be fed into the injector I. In the injector, mixing of the propellant, which is supplied via the propellant inflow Ja, is effected with the granulate which is supplied via the inflow Ib, the granulate being entrained by the propellant flow and discharged via the respective outlet Ic out of the respective injector I in the form of a granulate-propellant mixture M1 or M2. In front of each injector I1 or I2, a propellant pump P1 or P2 is connected and can be actuated for example via a motor M. Via the pumps P1 or P2, a respective propellant flow T1 or T2 is produced and supplied to the respective injector. According to the special embodiment according to FIG. 1, a branch W is provided in each propellant flow T1 or T2, via which branch a rinsing flow S1 or S2 can be branched out of the propellant flow produced by the pumps P1 or P2. In the rinsing flow, valves V for controlling the rinsing flow can be present. The rinsing flow is thereby fed into the source 10 and can be directed for example in the outlet flow direction of the granulate so that, by means of this rinsing flow, active discharge of the granulate out of the source 10 can be achieved. At the receiving places 11 and 12, separation of the granulate from the propellant can be effected, the propellant hence free of the granulate can be supplied again to the pumps P1 or P2.

FIG. 2 shows an alternative embodiment of a conveying device according to the invention. The same reference numbers thereby designate similar device components as represented in FIG. 1. In contrast to FIG. 1, the granulate source 10 thereby has only a single outlet A which is divided subsequently into three partial granulate flows G1, G2 and G3. The individual granulate flows G1, G2 and G3 are thereby supplied respectively to individual injectors I1, I2 and I3 which have respectively a propellant inflow Ja, a granulate inflow Jb and also an outlet Jc. In the case of the example of FIG. 2, three receiving places 11, 12 and 13 are present, for which reason the conveying device according to FIG. 2 also has three separate injectors I1, I2, I3. In front of the respective injectors, propellant pumps P1, P2, P3 are connected, a separate rinsing flow S1, S2, S3 being able, here also, to be branched off via the branches W1 to W3 and supplied to the source 10.

EXAMPLE

The production plant for PA6 granulate is operated in the following manner:

The extraction column (10) illustrated in FIG. 1 has two outlet connection pieces (A1, A2), 2 injectors (I1, I2) and 2 propellant pumps (P1, P2). The conveyed quantity per injector is 1,600 to 3,400 kg PA6 granulate/h. The produced granulate has a diameter of 2.5×2.5 mm. The propellant flow is 25 to 35 $m^3$ water/h at a propellant temperature of 95 to 99° C. The pressure in front of the injector is 6.5 to 9.5 bar. The conveying height of the granulate is 36 m. The propellant pumps are operated with frequency changers.

The invention claimed is:

1. A conveying device for conveying granular material, which is stored in a source, from the source to a plurality of receiving places, comprising
    a number of injectors corresponding to the number of receiving places, each injector having a propellant inflow, a granulate inlet connected to an outlet of the source and also an outlet for a mixture of propellant and granulate, and
    at least one propellant pump which is connected in front of each injector via the respective propellant inflow;
    wherein the receiving places have a separating device for separating granulate from the propellant and
    wherein the propellant is re-circulated.

2. The conveying device according to claim 1, wherein, between each injector and the respectively at least one pre-connected propellant pump, at least one branch is present for separating a rinsing flow of the propellant in the source.

3. The conveying device according to claim 1, wherein the rinsing flow is fed into the source such that granulate stored in the source is conveyed in the direction of the outlet.

4. The conveying device according to claim 1, wherein the rinsing flow is regulatable.

5. The conveying device according to claim 1, wherein the at least one propellant pump is a multistage centrifugal pump with closed or open impeller.

6. The conveying device according to claim 5, wherein the pressure and the conveyed quantity of the propellant flow at the propellant inflow can be adjusted, either via the speed of rotation of the propellant pump or via the use of a control valve between branch and the entrance of the injector.

7. The conveying device according to claim 1, wherein the conveying device is free of control mechanisms.

8. The conveying device according to claim 1, wherein the source
   a) has an outlet for the granulate, the granulate flow being divided, after leaving the source, via a branch into a number of partial flows corresponding to the number of receiving places and being supplied to a corresponding granulate inlet of an injector, or
   b) has at least two outlets via which a granulate flow respectively is removed from the source and supplied to a corresponding granulate inlet of an injector.

9. The conveying device according to claim 1, wherein the source is an extraction reactor for extracting granulate.

10. The conveying device according to claim 1, wherein the granular material is a granulate of a thermoplastic polymer.

11. The conveying device according to claim 1, wherein the propellant is liquid or gaseous and is selected from the group consisting of water or mixtures of water and ε-caprolactam.

12. A method for conveying granular material, which is stored in a source, from the source to a plurality of receiving places with a conveying device comprising a number of injectors corresponding to the number of receivers each injector having a propellant inflow, a granulate inlet connected to an outlet of the source and also an outlet for a mixture of propellant and granulate, and at least one propellant pump which is connected in front of each injector via the respective propellant inflow, wherein the receivers have a separating device for separating granulate from the propellant, in which a propellant flow is produced by means of the propellant pump and is fed via the respective propellant inflow into the respective injector, the granular material is discharged out of the at least one outlet of the source and supplied via the granulate inlet to an injector and is mixed in the injector with the propellant flow and discharged as granulate-/propellant flow via the outlet out of the respective injector, and is supplied to the respective receiving place, wherein a separation of the granular material from the propellant is effected at the receivers, and the propellant is re-circulated.

13. The method according to claim 12, wherein the propellant flow is divided into a rinsing flow and a propellant flow which is fed via the propellant inflow into the respective injector, the granular material being discharged by means of the rinsing flow out of the at least one outlet of the source and being supplied via the granulate inlet to an injector.

14. The method according to claim 12, wherein the pressure at the branch is set to be higher than the output pressure at the outlet of the source.

15. The conveying device according to claim 1, wherein the rinsing flow has a control valve.

16. The conveying device according to claim 1, wherein the granular material is polyamide granulate.

* * * * *